(12) United States Patent
Rachlin et al.

(10) Patent No.: US 9,007,260 B2
(45) Date of Patent: Apr. 14, 2015

(54) CODED FILTER

(75) Inventors: Yaron Rachlin, Brookline, MA (US); Rami Mangoubi, Newton, MA (US); Michael F. McManus, Halifax, MA (US); Christopher C. Yu, Belmont, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 260 days.

(21) Appl. No.: 13/167,248

(22) Filed: Jun. 23, 2011

(65) Prior Publication Data

US 2012/0127029 A1 May 24, 2012

Related U.S. Application Data

(60) Provisional application No. 61/416,115, filed on Nov. 22, 2010.

(51) Int. Cl.
*G01S 19/22* (2010.01)
*G01S 19/40* (2010.01)

(52) U.S. Cl.
CPC *G01S 19/22* (2013.01); *G01S 19/40* (2013.01)

(58) Field of Classification Search
USPC ............ 342/357.23, 357.61; 702/94; 714/781
IPC .............................................. G01S 19/22,19/40
See application file for complete search history.

(56) References Cited

U.S. PATENT DOCUMENTS

| | | | |
|---|---|---|---|
| 6,285,316 B1 * | 9/2001 | Nir et al. .................. 342/357.46 |
| 2004/0198296 A1 * | 10/2004 | Hui et al. ...................... 455/296 |
| 2005/0032477 A1 * | 2/2005 | Fernandez-Corbaton et al. ............................... 455/65 |
| 2005/0251328 A1 | 11/2005 | Merwe et al. |
| 2007/0016837 A1 * | 1/2007 | Candes et al. ................ 714/746 |
| 2007/0255495 A1 | 11/2007 | Alexander |
| 2008/0151971 A1 * | 6/2008 | Mo et al. ....................... 375/150 |
| 2008/0165053 A1 * | 7/2008 | Liu et al. .................. 342/357.03 |
| 2009/0135057 A1 * | 5/2009 | Vollath et al. ............ 342/357.03 |
| 2009/0265104 A1 | 10/2009 | Shroff |
| 2011/0064302 A1 * | 3/2011 | Ma et al. ....................... 382/159 |
| 2011/0299637 A1 * | 12/2011 | Buckley et al. ............... 375/341 |

OTHER PUBLICATIONS

I. Daubechies, Orthonormal Bases of Compactly Supported Wavelets, Communications on Pure and Applied Mathematics, vol. XLI, p. 909-996, 1988.*

J. Chaffee et al., GPS positioning, filtering, and integration, Proceedings of the IEEE 1993 National, Aerospace and Electronics Conference, vol. 1, p. 327-332, May 1993.*

(Continued)

*Primary Examiner* — Gregory C Issing
*Assistant Examiner* — Fred H Mull
(74) *Attorney, Agent, or Firm* — Lando & Anastasi, LLP

(57) ABSTRACT

A method and apparatus for estimating and compensating for a broad class of non-Gaussian sensor and process noise. In one example, a coded filter combines a dynamic state estimator (for example, a Kalman filter) and a non-linear estimator to provide approximations of the non-Gaussian process and sensor noise associated with a dynamic system. These approximations are used by the dynamic state estimator to correct sensor measurements or to alter the dynamic model governing evolution of the system state. Examples of coded filters leverage compressive sensing techniques in combination with error models based on concepts of compressibility and the application of efficient convex optimization processes.

14 Claims, 10 Drawing Sheets

(56) References Cited

OTHER PUBLICATIONS

P.S. Maybeck, Stochastic Models, Estimation, and Control: Introduction. Stochastic Models, Estimation, and Control, Academic Press, vol. 1, p. 1-16, 1979.*

E.J. Candes et al., Robust Error Correction by Convex Programming, IEEE Transactions on Information Theory, vol. 54(7), p. 2829-2840, 2008.*

P.S. Maybeck, Stochastic Models, Estimation, and Control: Introduction. Stochastic Models, Estimation, and Control, Academic Press, vol. 1, p. 1-16 and 217, 1979.*

M.S. Grewal et al., Kalman Filtering: Theory and Practice Using MATLAB, Second Edition, John Wiley & Sons, Inc., p. 179-180, 2001.*

Farrell, Jay et al., "Differential GPS Reference Station Algorithm—Design and Analysis", IEEE Transactions on Control Systems Technology, vol. 8, No. 3, May 2000, pp. 519-531.

* cited by examiner

CODED FILTER

BACKGROUND

1. Field of Invention

The present invention relates to estimation techniques, and more particularly, to methods and apparatus for estimating and compensating for certain types of non-Gaussian noise.

2. Discussion of Related Art

There are numerous applications that use Kalman filtering principles to estimate the state variables of dynamic systems. For example, many existing navigation systems combine GPS (global positioning system) and INS (inertial navigation system) measurements using Kalman filtering principles to achieve relatively accurate navigation. The Kalman filter is a mathematical method that estimates the state of a dynamic system, using a sequence of sensor measurements observed over time, by specifying the state transition model of the system, the observation model, and a representation of the noise in the system. When performing calculations for a Kalman filter, the state estimates and covariances are coded into matrices to handle the multiple dimensions in a single set of calculations. This allows for representation of linear relationships between different state variables (such as position, velocity, and acceleration) in any of the transition models or covariances. Noise in the sensor measurements, approximations in the system model, and/or unaccounted for external factors may all introduce uncertainty into predicted values for the state. The Kalman filter produces an estimate of the state by predicting a value of the state, estimating the uncertainty in the predicted value, and computing a weighted average of the predicted value and a new measured value of the state, with the most weight given to the value with the least uncertainty. This process is repeated over time to track the state. For example, in a navigation system to continuously provide the position of the navigator. The estimates produced by the Kalman filter lie between the measured values and the predicted values, and tend to be closer to the true values than the original measurements because the weighted average has a better estimated uncertainty than either the measured or predicted values alone.

In the navigation context, while these systems are sufficient for environments with good satellite visibility, complex environments (such as dense urban environments, for example) challenge existing Kalman-filter based systems due to the presence of significant unmodeled, non-Gaussian errors caused by phenomena such as multi-path. Multi-path occurs because the RF (radio frequency) signals are not travelling in free space between the source and destination and may be encountering reflective barriers, such as a building or topographic feature. Referring to FIG. 1, there is illustrated a diagram demonstrating the multi-path effect. A navigator 110 receives direct (non-reflected) signals 120 (solid lines) from sources 130 (e.g., GPS satellites), but also receives reflected signals 140 (dotted lines) that have reflected off buildings 150 or other obstructions. In some circumstances, the reflected signal 140 may be stronger (higher in amplitude) than the direct signal, resulting in errors in positional calculations in a navigation system; The Kalman filter model assumes that the noise in the system is Gaussian. However, errors in pseudo-ranges due to multipath are poorly approximated using Gaussian assumptions. To overcome these limitations in navigation systems, aiding information may be provided using sensors (e.g., magnetometers, Doppler radars, or cameras), databases (e.g., image databases), additional infrastructure (e.g., RF beacons), and signals of opportunity (e.g., television signals). While such approaches can provide useful aiding information, they can also experience errors that are not well modeled with Gaussian assumptions.

In addition, navigation systems using a Kalman filter in the position estimation process assume that the navigator's motion, and therefore change in position of the navigator from one estimation to the next, is smooth. However, in the presence of severe multi-path, the filtering process can compound the above-mentioned errors because the assumed relatively smooth motion becomes "jumpy," that is, the navigator appears to move dramatically between successive estimations. As a result, there can be significant error in the estimated position of the navigation, as illustrated for example in FIG. 2. In FIG. 2, trace 210 represents the actual movement of an example receiver, and trace 220 represents the estimated movement of the example receiver using a Kalman filter, in a multi-path environment.

There are a large number of methods for dealing with non-Gaussian noise. For example, some methods include thresholding based on measurement statistics, Gauss-Markov model-based approaches, particle filters (also known as successive Monte-Carlo methods), and iterative estimators such as RANSAC (RANdom SAmple Consensus). These methods suffer from several disadvantages. For example, practical methods accounting for non-Gaussian noise are often heuristic in nature and only partially effective. Thresholding methods discard potentially useful information and require estimation of the thresholds. Methods such as the particle filter and RANSAC can be computationally expensive for realistic systems.

SUMMARY OF INVENTION

Aspects and embodiments are directed to methods and apparatus for providing a filter that enables estimation of a broad class of non-Gaussian noise in using computationally tractable processes.

According to one embodiment, a processor-implemented method of estimating a state variable of a dynamic system comprises receiving from at least one sensor measurements of the state variable, the measurements being corrupted by compressible non-Gaussian noise, estimating the compressible non-Gaussian noise to provide an estimated non-Gaussian error, correcting the measurements based on the estimated non-Gaussian error to provide corrected measurements, and estimating the state variable based on the corrected measurements.

In one example of the method, estimating the state variable based on the corrected measurements includes providing the corrected measurements as an input to a dynamic state estimator, and running the dynamic state estimator to estimate state variable. The state variable may be the position, velocity or acceleration of a navigator, for example. The dynamic state estimator may be a Kalman filter, for example. In another example, estimating the state variable based on the corrected measurements further includes reconfiguring the dynamic state estimator based on the estimated non-Gaussian error to provide a reconfigured dynamic state estimator, and running the reconfigured dynamic state estimator with the corrected measurements to estimate the state variable. In another example, estimating the compressible non-Gaussian noise includes determining a basis in which the compressible non-Gaussian noise is compressible, and calculating coefficients of the basis in which the compressible non-Gaussian noise is compressible to provide a coefficient vector. Estimating the compressible non-Gaussian noise may further include determining an annihilation matrix which annihilates a portion of the measurements corresponding to the state variable, and applying a minimum l1 estimator to the coefficient vector subject to constraints based on the coefficient vector, the measurements and the annihilation matrix.

According to another embodiment, a processor-implemented method of estimating position of a navigator comprises receiving from a global positioning system (GPS) sensor GPS measurements of the position of the navigator, the GPS measurements being corrupted by multipath errors, estimating the multipath errors to provide an estimated error, correcting the GPS measurements based on the estimated error to provide corrected measurements, and estimating the position of the navigator based on the corrected measurements.

In one example of the method, estimating the position of the navigator based on the corrected measurements includes providing the corrected measurements as an input to a Kalman filter, and running the Kalman filter with the corrected measurements to estimate the position of the navigator. In another example, estimating the multipath errors includes calculating a coefficient vector of Haar wavelet coefficients that together approximate the multipath errors. Estimating the multipath errors may further include determining an annihilation matrix which annihilates a portion of the measurements corresponding to the position of the navigator, and applying a minimum l1 estimator to the coefficient vector subject to constraints based on the coefficient vector, the measurements and the annihilation matrix.

Another embodiment is directed to a position estimation device configured to estimate the position of a navigator, the device comprising an error estimator configured to receive sensor measurements corrupted by non-Gaussian noise, to estimate the non-Gaussian noise, and to provide corrected measurements based on the estimate of the non-Gaussian noise, and a position estimator coupled to the error estimator and configured to receive the corrected measurements and to estimate position of the navigator based on the corrected measurements.

In one example, the position estimator includes a Kalman filter. In another example, the error estimator is configured to determine a coefficient vector including coefficients of a basis in which the non-Gaussian noise is compressible. The error estimator may be further configured to determine an annihilation matrix which annihilates a portion of the sensor measurements corresponding to the position of the navigator based on an equation that defines a relationship between the sensor measurements, the position of the navigator and the non-Gaussian noise. In another example, the error estimator is configured to apply a minimum l1 estimator to the coefficient vector subject to constraints based on the coefficient vector, the measurements and the annihilation matrix, to provide the estimate of the non-Gaussian noise.

Still other aspects, embodiments, and advantages of these exemplary aspects and embodiments, are discussed in detail below. Any embodiment disclosed herein may be combined with any other embodiment in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
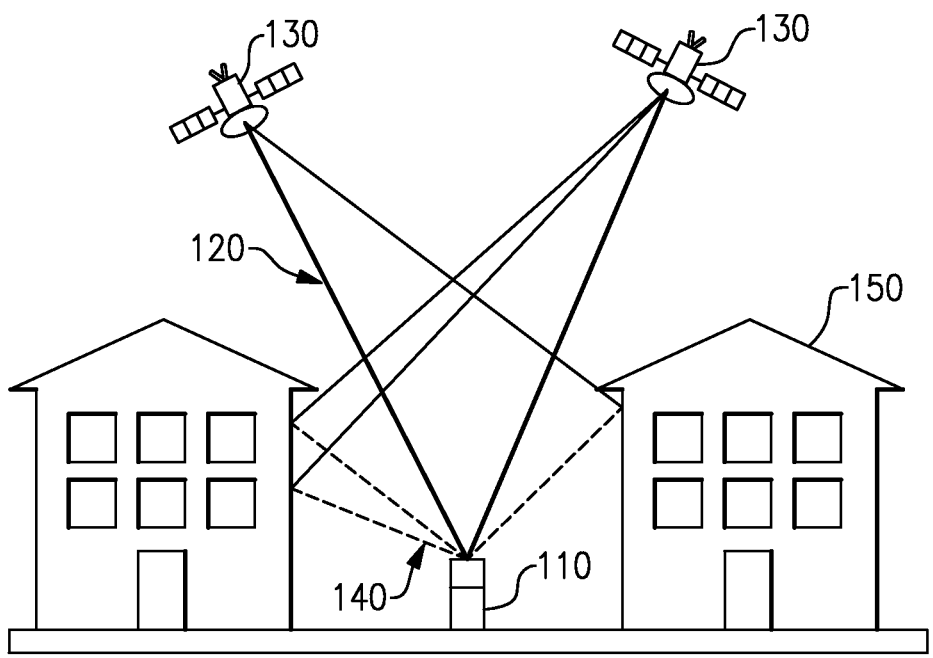
FIG. 1 is a block diagram illustrating an example of multipath.
Figure 2:
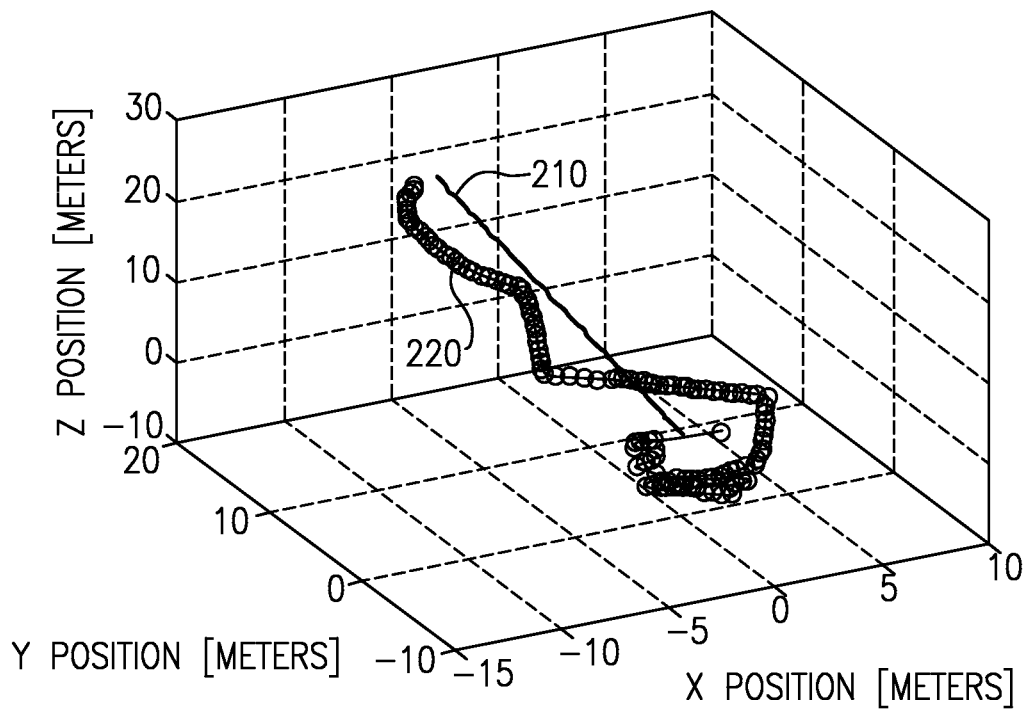
FIG. 2 is a graph illustrating actual versus estimated position of a navigator using a Kalman filter.

Non-Gaussian errors or noise occur in a number of environments of interest. For example, in dense urban environments, sometimes referred to as "urban canyons," GPS pseudo-ranges can become corrupted by non-Gaussian noise due to multipath. In another example, non-Gaussian process noise such as wind gusts can degrade estimation accuracy. Conventional estimators such as particle filters discussed above can compensate for such non-Gaussian noise, but at the cost of significant increases in computational complexity, making their use impractical in many applications. Aspects and embodiments are directed to methods and apparatus for estimating and compensating for a broad class of non-Gaussian sensor and process noise in a computationally efficient manner. The techniques discussed below can be applied to dynamic filtering problems where both the measurements and the underlying process are disturbed by additive non-Gaussian noise. Certain examples discussed below demonstrate the advantages of these techniques applied to multipath-corrupted GPS-based navigation.

According to one embodiment, a "coded filter" combines a standard filter (such as a Kalman filter, for example) and a non-linear estimator to provide approximations of the non-Gaussian process and sensor noise associated with a dynamic system. These approximations are used by the filter to correct sensor measurements (e.g., to subtract multipath from pseudo ranges) or to alter the dynamic model governing evolution of the system state, as discussed further below. This method may provide improved performance, particularly reduced errors in the estimations of state in a dynamic system, as discussed and demonstrated below. The coded filter leverages compressive sensing techniques in combination with error models based on concepts of compressibility and the application of efficient convex optimization processes, as discussed in more detail below.

Embodiments of a coded filter may be used in connection with a variety of navigation sensors or components including, for example, GPS, radar, sonar, and/or magnetometers (particularly, estimating field disturbances in magnetometers), as well with integrated multi-sensor multi-modal navigation systems comprising any of the above-mentioned components. For example, as discussed above, one application of the coded filter is in navigation systems where, in the presence of non-Gaussian structured noise, such as multi-path, an improvement may be obtained in estimating the position of a navigator. The coded filter may also be used in connection with Doppler radar for navigation and vision aided, navigation. The following examples may refer primarily to navigation systems; however, embodiments of the coded filter and estimation methods discussed herein may be used in a variety of applications, not limited to navigation, including, for example, calibration in sensors, failure detection (for example, in a machine or process where an unexpected or unmodeled "jump" occurs); accounting for the impact of wind gusts on aircraft; radar and/or sonar applications other than navigation, modeling orbit paths for spacecraft or satellites, and/or other applications in which there anomalous, non-Gaussian errors are present, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one embodiment, a random process to be estimated includes a sequence of states $x_t$ where $t \in \{1, \ldots, T\}$. The evolution of the state over time may be modeled as a time varying linear or non-linear dynamic system. Equation (1) below specifies the linear case, and Equation (2) specifies the non-linear case:

$$x_{t+1} = F_t x_t + v_t + e_t^p \quad (1)$$

$$x_{t+1} = g_t(x_t) + v_t + e_t^p \quad (2)$$

In Equations (1) and (2), $x_t$ is an n dimensional state vector, $F_t$ (for the linear case) and $g_t(x_t)$ (for the non-linear case) are n×n state transition model matrices which are applied to the previous state, and $v_t$ is the process noise which is assumed to be Gaussian with a zero mean, according to Equation (3) below.

$$v_t \approx N(0, Q_t) \quad (3)$$

In Equation (3), $Q_t$ is the covariance matrix of the process noise. In Equations (1) and (2), $e_t^p$ is a non-Gaussian process error vector defined by Equation (4):

$$e_t^p \in R^n \quad (4)$$

The initial state $x_1$ is assumed to be observed directly as $x_1$ by sampling from a Gaussian distribution with mean $x_1$ and a known covariance $P_1$. A linear observation of this process at time t is specified by:

$$y_t = H_t x_t + w_t + e_t^s \quad (5)$$

In Equation (5), $H_t$ is an m×n state observation model matrix which maps the true state space into the observed space, and $w_t$ is the observation noise which is assumed to be zero-mean Gaussian white noise with covariance $R_t$, given by Equation (6) below:

$$w_t = N(0, R_t) \quad (6)$$

Similarly, a non-linear observation of this process at time t is governed by a function h(t):

$$y_t = h_t(x_t) + w_t + e_t^s \quad (7)$$

Also in Equations (5) and (7), each entry $e_{it}^s$ in the non-Gaussian sensor noise or error vector $e_t^s$, where $i \in \{1, \ldots, m\}$ corresponds to a non-Gaussian error associated with sensor i. In one example, the error vectors are defined as follows:

$$e^p = \begin{bmatrix} e_1^p \\ e_2^p \\ \vdots \\ e_T^p \end{bmatrix}, e_i^s = \begin{bmatrix} e_{i1}^s \\ e_{i2}^s \\ \vdots \\ e_{iT}^s \end{bmatrix}, e^s = \begin{bmatrix} e_1^s \\ e_2^s \\ \vdots \\ e_T^s \end{bmatrix}, e = \begin{bmatrix} e^p \\ e^s \end{bmatrix} \quad (8)$$

As discussed above, in one embodiment the coded filter uses concepts of compressibility, and specifically is configured to estimate a broad class of non-Gaussian errors termed "compressible errors." As used herein, the term "compressible vector" refers to a vector that can be well approximated by few coefficients in some basis. Under certain conditions, compressible vectors can be recovered using very few linear measurements, as discussed further below. The vector e is considered compressible if its sorted coefficient magnitudes in a given basis decay rapidly according to a power-law. For a basis $\Psi$, the associated coefficient vector is $\alpha=\Psi^T e$. Using $\alpha_{(i)}$, i=1, ..., T(n+m) to denote the coefficients of a sorted from largest to smallest, e is compressible when, for a constant R, $$|\alpha_{(i)}| \leq R i^{-1/p}, p \leq 1 \tag{9}$$

Many signals of interest, including a broad set of navigation errors, are approximately sparse or compressible, with few large coefficients and many small coefficients.

Figure 3A:
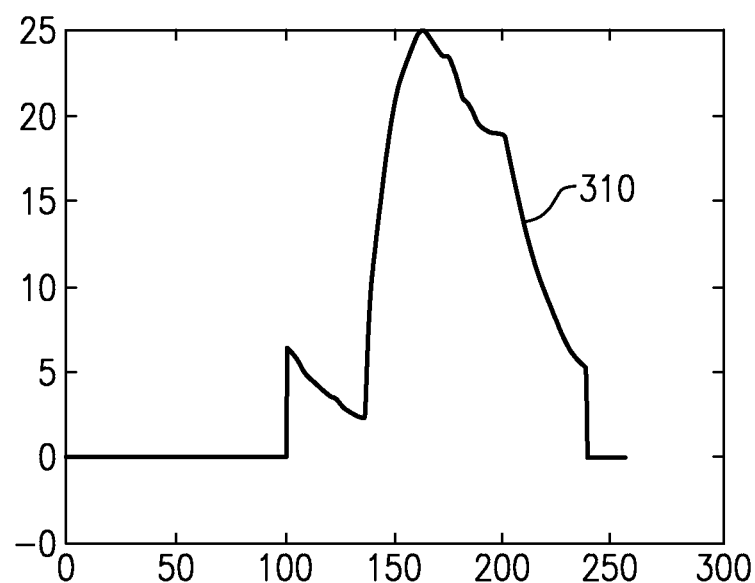
FIG. 3A is an illustration of an example of a GPS multipath signal
Figure 3B:
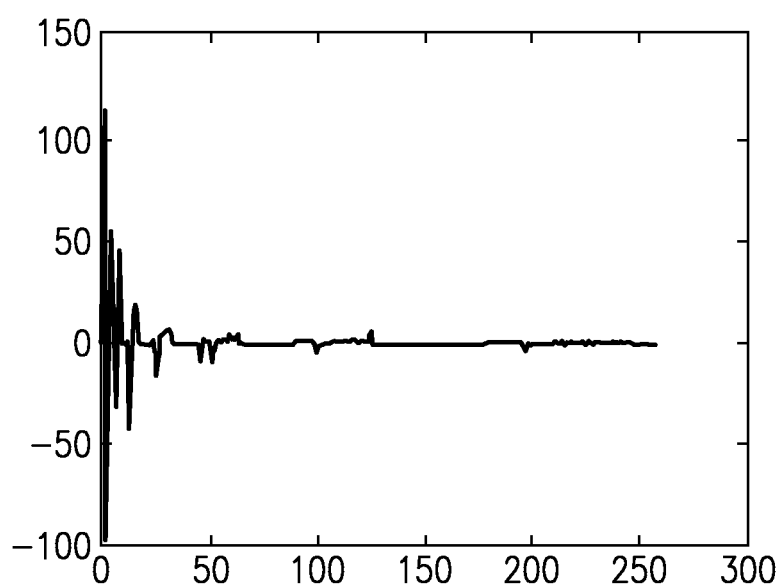
FIG. 3B is an illustration of the Haar wavelet transform of the signal of FIG. 3A.
Figure 3C:
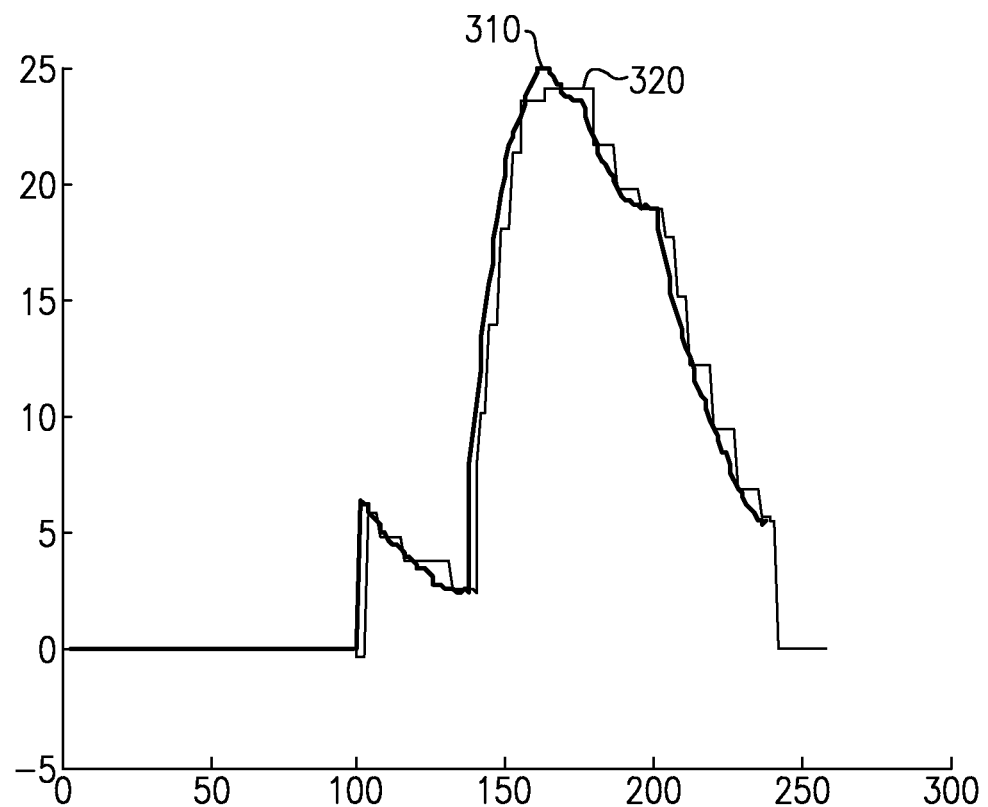
FIG. 3C is an illustration of the example GPS multipath signal of FIG. 3A and an estimation of the signal using the Haar wavelet transform of FIG. 3B.

There exist compressible errors that are poorly described by Gaussian assumptions. Furthermore, non-Gaussian errors of several sensors used in navigation and other applications are compressible. For example, GPS multipath is well approximated in a properly chosen wavelet basis. Referring to FIGS. 3A-C, there is illustrated an example of a GPS multipath signal 310 (FIG. 3A) that is compressible in a Haar wavelet (FIG. 3B) basis. FIG. 3C illustrates that the signal 310 is well approximated by the Haar wavelet coefficients as the resulting estimated signal 320 closely tracks the original signal 310. Accordingly, aspects and embodiments use this compressibility of certain non-Gaussian errors to obtain accurate estimates of errors that are difficult to estimate using conventional approaches.

In navigation scenarios where the non-Gaussian errors are compressible, measurements are a function of the state, which is not necessarily compressible, as well as the errors. As a result, the compressive sensing techniques discussed above may not be applied to navigation directly (e.g., as a replacement for the Kalman filter). However, for an overdetermined set of linear equations, estimating the compressible error vector and estimating the state are related problems. Accordingly, aspects and embodiments exploit the duality between compressive sensing and error correction of a channel code in communications theory, as explained below. This approach is referred to herein as coded filtering. According to certain embodiments, the navigation problem is formulated as a channel coding problem where the propagation and measurement equations encode the state (position of the navigator), and the decoder estimates the channel errors. This approach leverages the redundancy provided in the sensor measurements, together with the compressibility of the non-Gaussian errors, to first estimate the non-Gaussian errors e and then to estimate the state x using the corrected measurements and process noise model as discussed further below.

The channel coding problem can be represented as follows:

$$z = Ax + u + e \tag{10}$$

In Equation (10), z is the observation (or measurement), x is the vector representing the state being estimated, A is defined as an overdetermined matrix having M rows and N columns with M>N, u is the Gaussian noise vector, and e represents the compressible non-Gaussian errors. In the channel coding context, these quantities have known interpretations. The variable x is the message being sent, the matrix A is the encoding matrix that maps the message to a codeword, and the sum of the compressible errors and Gaussian noise corresponds to the channel noise.

To gain observability of the non-Gaussian errors e, a matrix is computed that annihilates the portion of the observations z that are caused by the state x. This annihilation matrix B can be defined having dimensions (M−N)×M, with rows that span the null space of $A^T$, such that BA=0. The conventional QR numeric algorithm may be used to compute the eigenvalues and eigenvectors of the annihilation matrix B. In the channel coding context, the matrix B acts as a parity check matrix in the linear channel code. B can be applied to Equation (10) to obtain:

$$Bz = Bu + Be \tag{11}$$

Since it is the non-Gaussian errors e that are of interest, Equation (9) can be reformulated as follows:

$$B^T e = B^T z - B^T u \tag{12}$$

The matrix B eliminates x by projecting the measurements z onto a space orthogonal to the range of A. Equations (11) and (12) define an underdetermined system of linear equations corrupted by Gaussian noise. Since B is underdetermined, there are an infinite number of solutions to Equation (11), even in the noiseless case. As a result, direct least squares estimation techniques, as may be applied to estimate Gaussian noise, do not lead to an accurate estimate of e. However, developments in the field of compressive sensing have shown that if a signal has a sparse or compressible representation in one basis then it can be recovered from a small number of linear projections (see, Candes, E. J., Romberg, M., Tao, T., "Stable signal recovery from incomplete and inaccurate measurements," *Comm. Pure Appl. Math.*, Vol. 59, 2005, pp. 1207-1223; and Donoho, D., "Compressed sensing," *IEEE Transactions on Information Theory*, Vol. 52(4), 2006, pp. 1289-1306).

According to one embodiment, the connection between error correction (channel coding) and compressive sensing is recognized and applied to dynamic estimation problems by constructing them in the form of Equation (10) above. Applying the concepts of compressive sensing in the context of Equation (11) demonstrates that if e is compressible, and assuming B satisfies certain conditions and that M-N is sufficiently large, e can be accurately estimated from the measurements Bz by solving an associated convex optimization problem. Embodiments of the coding filtering methods discussed below exploit the structure of several dynamic estimation problems of interest to efficiently compute the matrix B. Using B to annihilate the contribution of the state to the measurements, the following convex optimization problem (in this example, a second order cone program) can be solved to estimate the error e:

$$\underset{\tilde{\alpha}}{\text{minimize}} \|\tilde{\alpha}\|_{l_1} \tag{13}$$

$$\text{subject to } \|(Bz - B\Psi_i \tilde{\alpha})\|_{\Sigma^{-1}, l_2} \leq \epsilon$$

As discussed above, for a given basis $\Psi$ in which e is compressible, $\alpha$ is the associated coefficient vector given by $\alpha=\Psi^T e$. For simplicity in notation, "placeholder" quantities v and S can be defined as $v=Bz-B\Psi_{i\tilde{\alpha}}$ and $S=\Sigma^{-1}$ respectively. Then, in Equation (13):

$$\|v\|_{S, l_2} = \sqrt{v^T S v} \tag{14}$$

Also in Equation (13), $\Sigma$ is the covariance of the Gaussian noise vector u projected onto the null space of A, i.e., the covariance of the vector Bu, and $\epsilon$ is a noise constraint (the larger $\epsilon$, the more noise) which may be chosen based on the magnitude of the Gaussian noise. Equation (13) specifies minimizing the $l_1$ norm of $\alpha$. Letting $\alpha^*$ be the vector that is the solution to Equation (13), e may be estimated as $\tilde{e}=\Psi\alpha^*$. Using the formulation of Equation (13), the noise constraint E may be interpreted as a bounding chi-distributed random variable with M−N degrees of freedom. In certain examples, $\epsilon$ is chosen as the $90^{th}$ percentile of the chi distribution, such that $\|(Bz-B\Psi_i\alpha)\|_{\Sigma^{-1},l2} \leq \epsilon$ with a probability of 0.90.

In some embodiments, the estimate of e obtained by solving Equation (13) is corrupted by Gaussian noise. Therefore, there may be non-zero entries of $\alpha^*$ that are zeros in the true $\alpha$. To mitigate this problem, statistical hypothesis testing may be used to choose the entries of $\alpha$ that arise due to the compressible process and sensor noise. In one example, the following set is defined:

$$I = \{i: \|B\Psi_i\alpha_i\|_{\Sigma^{-1},l2} \geq \tau\} \quad (15)$$

In Equation (15), $\Psi_i$ corresponds to the column i of $\Psi$. The formulation of Equation (15) uses a statistical hypothesis test to select the entries of a that were not generated by Gaussian noise, with a confidence defined by $\tau$. In one example, the quantities can be selected such that $t=E$. This process augments the state to facilitate obtaining a better estimate of the state.

Embodiments of the coded filtering methods discussed below exploit the fact that many non-Gaussian errors are sparse in some basis (and therefore compressible) to obtain an accurate estimate using a minimum l1 estimator, and then apply the estimated errors in the original state estimation problem (e.g., estimating the position, velocity, acceleration, etc. of a navigator) to obtain more accurate results. In one embodiment, following the error estimation process discussed above, a conventional least squares estimator is applied to obtain an unbiased estimate of the augmented state and the associated covariance matrix. In one example, $\alpha_1$ is defined as a vector of length $|I|$, and $\Psi_1$ as the M×|I| matrix formed by selecting only the columns of $\Psi$ indexed by I. Accordingly, performing a least squares estimation includes solving the following optimization problem:

$$\underset{x,\alpha_1}{\text{minimize}} \left\| y - [A \ \Psi_1] \begin{bmatrix} x \\ \alpha_1 \end{bmatrix} \right\|_{S^{-1},l2} \quad (16)$$

In Equation (16), S is the covariance matrix of the Gaussian noise vector u. Embodiments of this process of estimating non-Gaussian errors, correcting the state measurements, and then estimating the state using the corrected measurements may be applied to a wide variety of dynamic estimation problems, some examples of which are discussed below.

Figure 4:
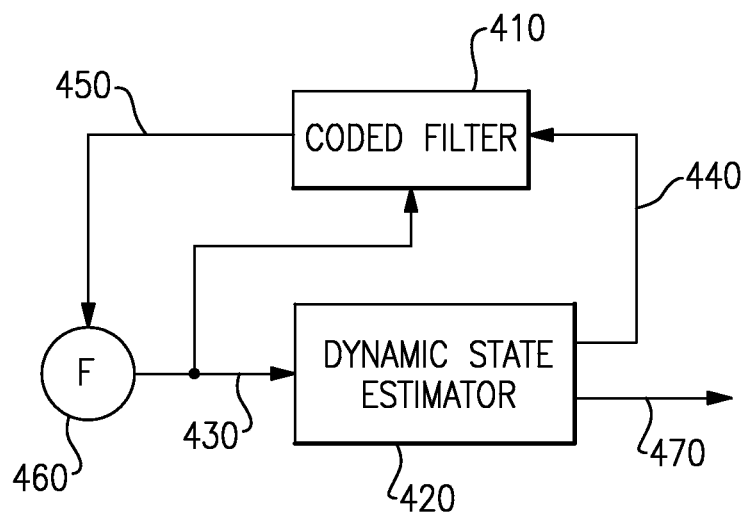
FIG. 4 is a block diagram of one example of a system including a coded filter according to aspects of the invention.

Referring to FIG. 4 there is illustrated a block diagram of one example of a system incorporating a coded filter according to one embodiment. As discussed above, according to one embodiment, the coded filter 410 operates in conjunction with a state estimator employing a dynamic estimation algorithm 420, such as a Kalman filter, for example, to provide improved estimations of the state. The coded filter 410 receives as inputs the measurements 430 of the state, which are also input to the state estimator 420, and a description of the model 440 used by the state estimator to estimate the state. The output 450 of the coded filter 410 is used to correct the original measurements, this correction being represented by function block 460, to provide improved/corrected measurement data 430 to the state estimator 420. This improved measurement data is then used by the state estimator 420 to estimate the state, and these state estimates form the output 470 of the state estimator. Thus, the coded filter 410 is "wrapped around" the underlying state estimator and implements a smoothing technique that improves the state estimates provided by the state estimator through improving the measurement data used by the state estimator. In particular, in one embodiment, the coded filter 410 is configured to estimate compressible non-Gaussian noise or errors in the measurements 430 and correct the measurements based on the estimated compressible non-Gaussian errors.

Figure 5:
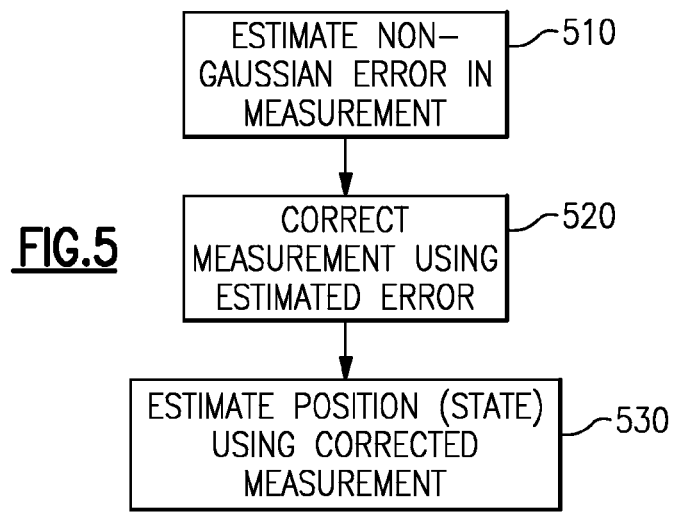
FIG. 5 is a flow diagram illustrating one example of a method of estimating the a state variable according to aspects of the invention

Thus, referring to FIG. 5, in the navigation context, the coded filter 410 replaces estimation of the position of the navigator ($x_k$) with estimation of the error in the measurement of the navigator's position (step 510). The estimated error is then used to correct the measurements (step 520), and the corrected measurements can be used by the state estimator 420 to estimate the position of the navigator (step 530).

The following examples illustrate the application of coded filtering methods to various dynamic state estimators, include the Kalman filter and L1 smoother.

Example 1

In this example, a coded filter is applied to a Kalman filter state estimator. The coded filter modifies the dynamic state estimation algorithm used by the Kalman filter by estimating the vectors $e_t^p$ (non-Gaussian process noise) and $e_t^s$ (non-Gaussian sensor noise) at each time step, and using these estimates to correct the Kalman filter update and propagation steps, as discussed further below. The following formulation is accurate when the error vectors are compressible at each time step. Examples include sensor measurements where at any point in time only a small fraction of the sensors experience non-Gaussian noise, and propagation disturbances that affect only a small subset of the state variables.

According to one embodiment, for this example, the linear dynamic and measurement model of Equation (1) above can be rewritten in matrix form as follows:

$$\begin{bmatrix} 0 \\ y_t \end{bmatrix} = \begin{bmatrix} -F_{t-1} & I \\ 0 & H_t \end{bmatrix} \cdot \begin{bmatrix} x_{t-1} \\ x_t \end{bmatrix} + \begin{bmatrix} -v_{t-1} \\ w_t \end{bmatrix} + \begin{bmatrix} -e_{t-1}^p \\ e_t^s \end{bmatrix} \quad (17)$$

As in a conventional Kalman filter, the assumption can be made that $x_{t-1} \sim N(u_{t-1}, P_{t-1})$ for a known $u_{t-1}$ (Gaussian noise from the prior time step) and $P_{t-1}$ (covariance from the prior time step). Introducing the variable $d_{t-1} = x_{t-1} - u_{t-1}$, and defining $v'_{t-1} = v_{t-1} + F_{t-1}d_{t-1}$. Equation (17) can be rewritten:

$$\begin{bmatrix} 0 \\ y_t \end{bmatrix} = \begin{bmatrix} -F_{t-1} & I \\ 0 & H_t \end{bmatrix} \cdot \begin{bmatrix} u_{t-1} \\ x_t \end{bmatrix} + \begin{bmatrix} -v'_{t-1} \\ w_t \end{bmatrix} + \begin{bmatrix} -e_{t-1}^p \\ e_t^s \end{bmatrix} \quad (18)$$

Equivalently:

$$\begin{bmatrix} F_{t-1}u_{t-1} \\ y_t \end{bmatrix} = \begin{bmatrix} I \\ H_t \end{bmatrix} x_t + \begin{bmatrix} -v'_{t-1} \\ w_t \end{bmatrix} + \begin{bmatrix} -e_{t-1}^p \\ e_t^s \end{bmatrix} \quad (19)$$

Equation (19) may be identified with Equation (10) as follows to apply the channel coding analogy discussed above:

$$z = \begin{bmatrix} F_{t-1}u_{t-1} \\ y_t \end{bmatrix}, A = \begin{bmatrix} I \\ H_t \end{bmatrix}, u = \begin{bmatrix} -v'_{t-1} \\ w_t \end{bmatrix}, e = \begin{bmatrix} -e_{t-1}^p \\ e_t^s \end{bmatrix} \quad (20)$$

Equation (20) defines specific examples of the variables of Equation (10) for this Kalman filter example. As discussed above, A is an overdetermined coding matrix. In this example, A has the structure of a systematic channel code. Such channel codes can be defined by their generator matrix which includes a stacked identity matrix and a second matrix that encodes linear functions of subsets of the message being transmitted. This second matrix produces parity check bits that are used to detect and correct errors in communications. As may be done for systematic channel codes, in this example, the structure of the generator matrix may be exploited to define the matrix B which is similar in structure to a parity check matrix:

$$B = [-H_t I] \quad (21)$$

In this example, the non-Gaussian error vector e can be estimated by solving Equation (13) using the matrices defined in Equations (17)-(21). For this example, $\Sigma$ is the following m×m positive definite matrix:

$$\Sigma = H_t(Q_{t-1} + F_{t-1} P_{t-1} F_{t-1}^T) H_t^T + R_t \quad (22)$$

$\Sigma$ is the true covariance of the Gaussian errors projected onto the null space of A. The coefficients of $\alpha^*$ that solve Equation (13) may be used to estimate the non-Gaussian errors as $e^* = \Psi\alpha^*$, as discussed above. As also discussed above, once the non-Gaussian errors have been estimated, thresholding as specified in Equation (13) above may be used to define support for the state, namely the set I of indices of entries in the state vector that are non-zero. A conventional least squares approach may then be used to obtain an unbiased estimate (and covariance) of the state by solving Equation (16).

Figure 6:
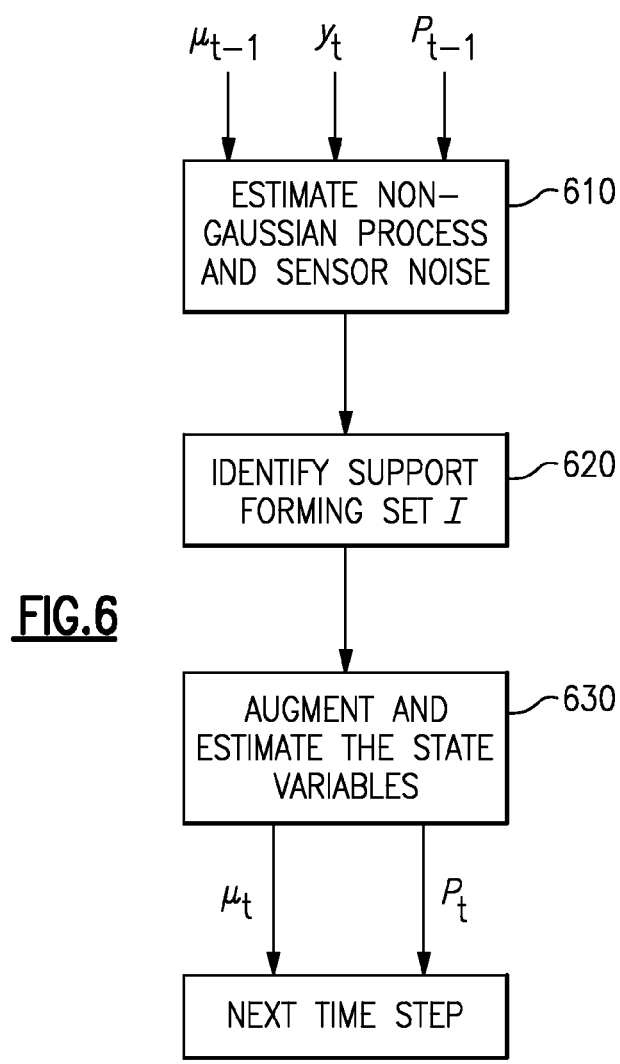
FIG. 6 is a flow diagram of one example of a coded filtering process applied to a Kalman filter state estimator according to aspects of the invention.

Referring to FIG. 6, there is illustrated a flow diagram of one embodiment of a coded filtering process applied to a Kalman filter state estimator. Given known quantities known $u_{t-1}$ (given by Equation (20) above), $P_{t-1}$ (covariance from the prior time step), and $y_t$ (the current measurement) at each time step the non-Gaussian process noise $e_{t-1}^p$ and sensor noise $e_t^s$ in the measurement applied to the Kalman filter can be estimated (step 610) by solving Equation (13) using the matrices defined in Equations (17)-(21). In step 620, the support set I is identified by solving Equation (14) using the matrices defined in Equations (21) and (22). The support set I may be used to augment the state variables, and a least squares estimator may then be used to obtain an unbiased estimate (and covariance) of the state by solving Equation (16). This process may be repeated for successive time steps to obtain updated estimates of the state over time.

Example 2

The Kalman filter assumes linear propagation and measurements. The above-discussed process for the Kalman filter example (Example 1) may be extended to non-linear propagation and measurement functions by applying conventional linearization techniques used in the derivation of the extended Kalman filter. As discussed above, the evolution of the state of a non-linear dynamic system over time is governed by a non-linear function $g_t$ and can be modeled according to Equation (2) above. Equation (2) may be approximated by using a first order Taylor series around the current estimate of the mean $\hat{u}_{t-1}$:

$$x_t = g_t(\hat{u}_{t-1}) + G_{t-1}(x_{t-1} - \hat{u}_{t-1}) + v_{t-1} + e_{t-1}^p + \mathrm{err}_{t-1}^g \quad (23)$$

In Equation (23) the matrix $G_{t-1}$ is the Jacobian of $g_t$ at $\hat{u}_{t-1}$ and the error vector $\mathrm{err}_{t-1}^g$, is the difference between the approximation (using the first order Taylor series) and the actual value of the non-linear function (i.e., the linearization error). As discussed above, a non-linear observation of this process at time t is governed by a function h(t), and may be modeled according to Equation (7). Equation (7) similarly may be approximated using a first order Taylor series expansion around $\bar{u}_t = g_{t-1}(\hat{u}_{t-1})$ as follows:

$$y_t = h_t(\bar{u}_t) + H_t(x_t - \bar{u}_t) + w_t + e_t^s + \mathrm{err}_t^h \quad (24)$$

In Equation (24) the matrix $H_1$ is the Jacobian of $h_t$ at $\bar{u}_t$, and the error vector $\mathrm{err}_t^h$ is the linearization error.

Combining these linearized Equations (23) and (24) provides:

$$\begin{bmatrix} 0 \\ y_t \end{bmatrix} = \begin{bmatrix} -G_{t-1} & I \\ 0 & H_t \end{bmatrix} \cdot \begin{bmatrix} x_{t-1} \\ x_t \end{bmatrix} + \begin{bmatrix} G_{t-1}\hat{u}_{t-1} - \bar{u}_t \\ h_t(\bar{u}_t) - H_t\bar{u}_t \end{bmatrix} + \begin{bmatrix} -v_{t-1} \\ w_t \end{bmatrix} + \begin{bmatrix} -e_{t-1}^p \\ e_t^s \end{bmatrix} + \begin{bmatrix} -\mathrm{err}_{t-1}^g \\ \mathrm{err}_t^h \end{bmatrix} \quad (25)$$

In one embodiment, $x_{t-1}$ is approximated as $\hat{u}_{t-1}$, and the following variables are defined: $d_{t-1} = x_{t-1} - \hat{u}_{t-1}$; $v'_{t-1} = v_{t-1} + G_{t-1} d_{t-1} + \mathrm{err}_{t-1}^g$; and $w'_t = w_t + \mathrm{err}_t^h$. Accordingly, $$\begin{bmatrix} \bar{u}_t \\ y_t - h(\bar{u}_t) + H_t \bar{u}_t \end{bmatrix} = \begin{bmatrix} I \\ H_t \end{bmatrix} x_t + \begin{bmatrix} -v'_{t-1} \\ w'_t \end{bmatrix} + \begin{bmatrix} -e_{t-1}^p \\ e_t^s \end{bmatrix} \quad (26)$$

In grouping the linearization errors with the Gaussian noise, it is assumed that the linearization errors are small and not detectable above the Gaussian noise. Equation (26) can be identified with the channel coding Equation (10) as follows:

$$z = \begin{bmatrix} \bar{u}_t \\ y_t - h(\bar{u}_t) + H\bar{u}_t \end{bmatrix}, A = \begin{bmatrix} I \\ H_t \end{bmatrix},$$
$$u = \begin{bmatrix} -v'_{t-1} \\ w'_t \end{bmatrix}, e = \begin{bmatrix} -e_{t-1}^p \\ e_t^s \end{bmatrix} \quad (27)$$

Based on Equations (25)-(27), a parity check matrix can be defined according to Equation (11) above. As in Example 1 above for the Kalman filter case, Equation (13) may be solved to estimate e, using the matrices defined in this Example and the following covariance:

$$\Sigma = H_t(Q_{t-1} + G_{t-1} P_{t-1} G_{t-1}^T) H_t^T + R_t \quad (28)$$

However, unlike Example 1 where $\Sigma$ is the true covariance of the Gaussian errors projected onto the null space of A, in this example $\Sigma$ is an approximation since the covariance of the linearization errors is unknown.

The process discussed above with reference to FIG. 6 may similarly be applied in this example for the extended Kalman filter case, using the matrices defined in this Example. The process may be repeated for successive time steps to obtain updated estimates of the state over time.

Example 3

The Kalman filter (Example 1) and extended Kalman filter (Example 2) coded filtering processes discussed above may apply in cases where the non-Gaussian errors are compressible at each time step. However, there exist cases where the non-Gaussian errors are compressible across time, but necessarily at each point in time. Some examples include sensor measurements where a significant fraction of sensors experience non-Gaussian noise that is structured over time. For example, in the navigation context, this situation may exist where a majority of the GPS channels are corrupted by multipath, but the environmental geometry causing the multipath reflections does not vary too rapidly.

Therefore, according to one embodiment, a batch formulation of the estimation problem for the linear dynamic system defined by Equations (1) and (4) is used. The batch formulation groups together measurements over a predetermined time frame to create a collection of measurements that can be analyzed together. Using the batch formulation, the portion of the measurements over time that are determined by the state can be annihilated, allowing direct estimation of the non-Gaussian noise vector. In one embodiment, this new estimation problem is under-determined, and as a result a direct least-squares estimation approach does not lead to an accurate solution, as demonstrated below. However, other estimators such as the minimum $l_1$ estimator or a combination minimum $l_1$ and minimum $l_2$ estimator discussed above may provide very accurate estimation of a compressible non-Gaussian noise vector.

Analogizing the batch formulation of the estimation problem to the channel coding example defined by Equation (10), at time T, the T(n+m)×Tn a batch matrix A may be defined by Equation (29) below, and batch vectors maybe defined according to Equation (30):

$$A = \begin{bmatrix} I & 0 & 0 & \cdots & 0 \\ H_1 & 0 & 0 & & 0 \\ -F_1 & I & 0 & & 0 \\ 0 & H_2 & 0 & & 0 \\ 0 & -F_2 & I & & 0 \\ \vdots & & \ddots & & \vdots \\ 0 & 0 & & & I \\ 0 & 0 & \cdots & 0 & H_T \end{bmatrix} \quad (29)$$

$$z = \begin{bmatrix} \hat{x}_1 \\ y_1 \\ 0 \\ y_2 \\ 0 \\ \vdots \\ y_m \end{bmatrix}, x = \begin{bmatrix} x_1 \\ x_2 \\ \vdots \\ x_T \end{bmatrix}, u = \begin{bmatrix} w_0 \\ w_1 \\ v_1 \\ w_2 \\ v_2 \\ \vdots \\ w_T \end{bmatrix}, e = \begin{bmatrix} e_0^s \\ e_1^s \\ e_1^p \\ e_2^s \\ e_2^p \\ \vdots \\ e_T^s \end{bmatrix}. \quad (30)$$

As in Examples 1 and 2 discussed above, an embodiment of the coded filter can be configured to first estimate the compressible error vector e, and then use those estimates to modify the underlying dynamic state estimator, for example, an L1 smoother. In one example, the matrix B is directly computed by taking a full QR factorization of A. However, this approach may be computationally intensive. Accordingly, in another example, one may take advantage of the structure of the batch formulation by defining B as:

$$B = \begin{bmatrix} H_1 & -I_m & 0 & 0 & 0 & 0 & \cdots & 0 \\ H_2\phi_1 & 0 & H_2 & -I_m & 0 & 0 & & 0 \\ H_3\phi_2\phi_1 & 0 & H_3\phi_2 & 0 & H_3 & -I_m & & 0 \\ \vdots & & & & & & \ddots & \vdots \\ H_T\prod_{i=1}^{T-1}\phi_i & 0 & H_T\prod_{i=2}^{T-1}\phi_i & 0 & H_T\prod_{i=3}^{T-1}\phi_i & \cdots & H_T & -I_m \end{bmatrix} \quad (31)$$

The structure of A and B provided by the underlying dynamic system model, for example, the navigation system in which the state to be estimated by the dynamic state estimator is the position of the navigator, may be exploited the efficiently compute the projection of a vector by B onto the null space of A.

Figure 7A:
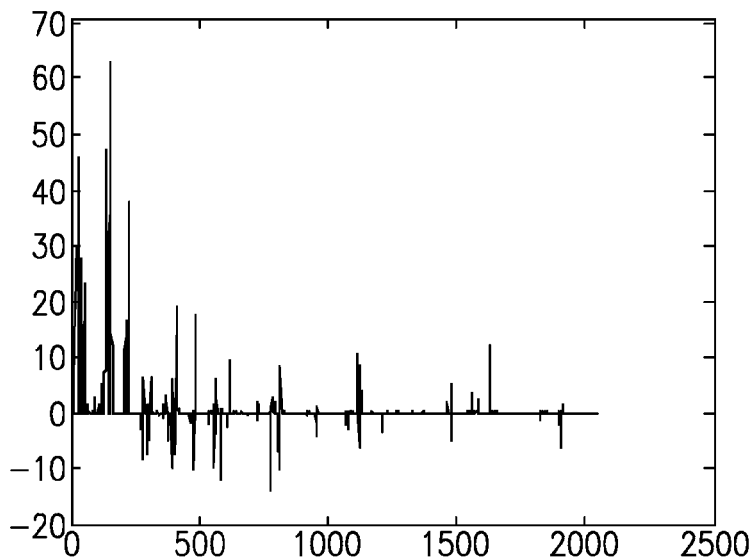
FIG. 7A is an illustration of an example wavelet transformation of a multipath signal.
Figure 7B:
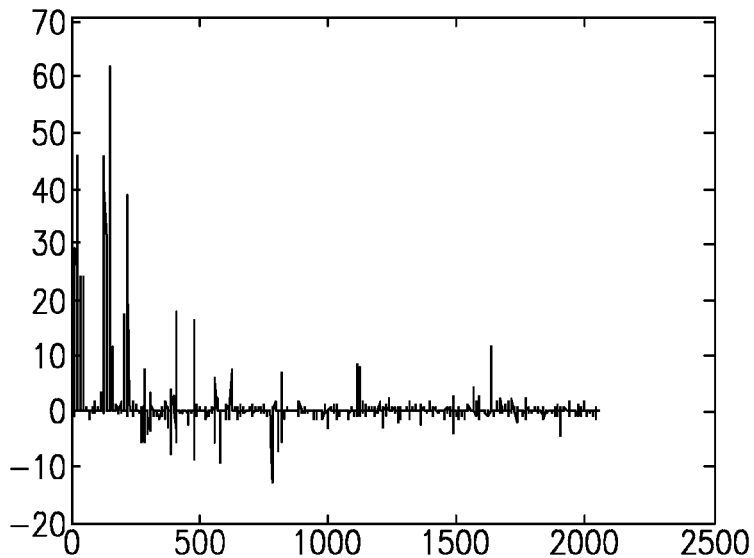
FIG. 7B is an illustration of an estimation of the signal of FIG. 7A using a minimum $l_1$ estimator.
Figure 7C:
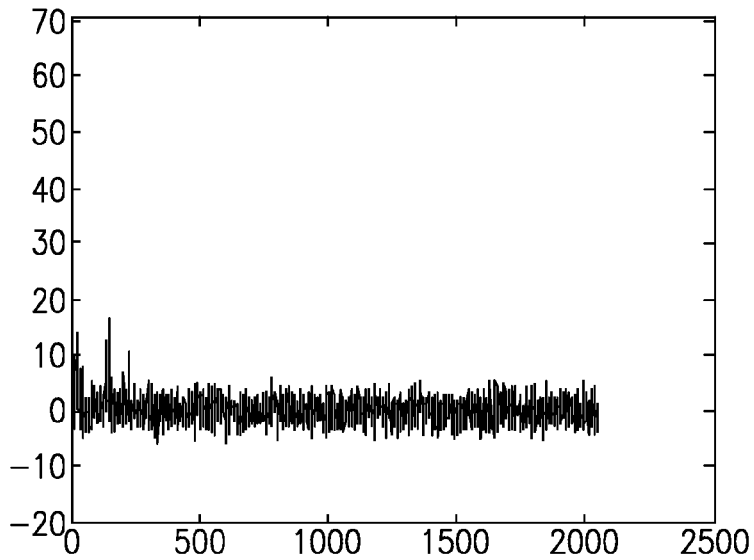
FIG. 7C is an illustration of an estimation of the signal of FIG. 7A using a least-squares estimator.

Referring to FIGS. 7A-C, there is illustrated an example of using an embodiment of the coded filtering method of Example 3 with a minimum $l_1$ estimator to estimate multipath error. FIG. 7A illustrates the original signal, which is a wavelet transform of a multipath signal. The original signal is estimated using an underdetermined 500 by 2048 matrix A in Equation (29) above. FIG. 7B illustrates the resulting estimated signal using a minimum $l_1$ estimator as given above in Equation (11). As can be seen from comparison of FIG. 7A and FIG. 7B, the minimum $l_1$ estimator provides a very good estimation of the original signal. By contrast, as shown in FIG. 7C, a conventional least squares estimation $(A^T(A \cdot A^T)^{-1})$ of the original signal directly provides a very poor result in which almost all detail of the original signal is lost. These comparisons demonstrate that where the non-Gaussian noise is sufficiently compressible in some basis, for example, in a wavelet basis as illustrated above, the minimum $l_1$ estimator may provide a very accurate result whereas the least squares estimator does not provide a good solution.

Example 4

Example 3 applied coded filtering to an L1 smoother for a linear time-varying system. In this example, the batch formulation discussed in Example 3 is extended to describe a batch formulation of the estimation problem for non-linear dynamic and measurement models over T time steps. This example is referred to as an extended L1 smoother. In this example, the formulation is based on an existing set of estimates of the state $\{\tilde{u}_1, \ldots, \tilde{u}_{T-1}\}$ for linearization. Such estimates may be obtained through a filter, or if an accurate dynamics model is available (as in certain space applications, for example), through propagation of the initial state.

In this example, the evolution of the state over time is governed by a non-linear function $g_t$, as in Example 2, and the linearized system equation is given by Equation (23) above. As in Example, 2, $G_{t-1}$, is the Jacobian of $g_{t-1}$ at $\hat{u}_{t-1}$, and the error vector $err_{t-1}^g$ is the associated linearization error. The linearized observation at time t is given by Equation (24) above, and the following variables are defined: $\bar{u}_t = g_{t-1}(\tilde{u}_{t-1})$; $H_t$ is the Jacobian of $h_t$ at and the error vector $err_t^h$ is the associated linearization error. Applying the batch formation from Example 3 to the linearized system, and analogizing to the channel coding problem defined in Equation (10), at time T, the T(n+m)×Tn batch matrix A may be defined as follows:

$$A = \begin{bmatrix} I & 0 & 0 & \cdots & 0 \\ H_1 & 0 & 0 & & 0 \\ -G_1 & I & 0 & & 0 \\ 0 & H_2 & 0 & & 0 \\ 0 & -G_2 & I & & 0 \\ \vdots & & \ddots & & \vdots \\ 0 & 0 & & -G_{T-1} & I \\ 0 & 0 & \cdots & 0 & H_T \end{bmatrix} \quad (32)$$

The following batch vectors may also be defined:

$$y = \begin{bmatrix} \hat{x}_1 \\ y_1 - h_1(\hat{x}_1) + H_1\hat{x}_1 \\ \bar{\mu}_2 - G_1\hat{x}_1 \\ y_2 - h_2(\bar{\mu}_2) + H_2\bar{\mu}_2 \\ \bar{\mu}_3 - G_3\bar{\mu}_2 \\ \vdots \\ y_T - h_T(\bar{\mu}_T) + H_T\bar{\mu}_T \end{bmatrix}, x = \begin{bmatrix} x_1 \\ x_2 \\ \vdots \\ x_T \end{bmatrix}, u = \begin{bmatrix} w_0 \\ v_1 + err_1^h \\ w_1 + err_1^g \\ v_2 + err_2^h \\ w_2 + err_2^g \\ \vdots \\ w_T + err_t^h \end{bmatrix}, \quad (33)$$

$$e = \begin{bmatrix} e_0^s \\ e_1^p \\ e_1^s \\ e_2^p \\ e_2^s \\ \vdots \\ e_T^s \end{bmatrix}$$

As in Example 2, the matrix B given by Equation (31) may be used to annihilate the portion of the measurements that are determined by the state, allowing direct estimation of the non-Gaussian noise vector, followed by augmentation of the state variables and solving of Equation (16) to obtain corrected estimates of the state.

Example 5

Figure 8:
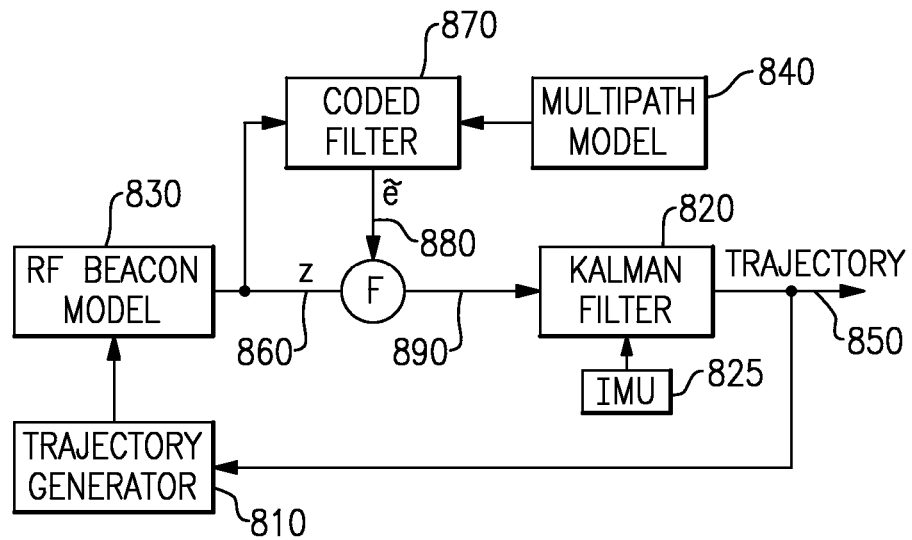
FIG. 8 is a functional block diagram of an example simulation of navigation system using a coded filter according to aspects of the invention.

This example demonstrates an embodiment of the coded filtering method applied to a simulation of a navigation system with significant multipath errors. FIG. 8 illustrates a block diagram of the simulation. The simulation elements include a trajectory generator 810 that generates true changes in the direction (Δθ) and velocity (ΔV) of the navigator 820, an inertial measurement unit (IMU) model 825, an RF beacon model 830 which models sensors that detect the navigator's position, a multipath model 840, and a simulation of the navigator 820. In this example, the multipath model includes the model described in Farrell, J. A. and Givargis, T., Differential GPS Reference Station Algorithm (Design and Analysis), IEEE Transactions on Control Systems, Vol. 8, No. 3, May 2000. The simulation of the navigator 820 includes a 39 state Kalman filter. The Kalman filter 820 generates estimates of the navigator's position, and thus over time outputs a signal representative of the navigator's trajectory 850. The RF beacon model 830 outputs simulated measurements 860 of the navigator's position which are subject to the multipath errors or noise. The coded filter 870 receives the noisy measurements 860 from the RF beacon and the multipath model 840, and generates estimates 880 of the multipath errors in the noisy measurements 860, using the batch formulation discussed in Example 3 above. These estimates 880 are used to correct the noisy measurements 860 to account for the multipath errors, and the corrected data 890 is input to the Kalman filter 820 that simulates the moving navigator.

Figure 9:
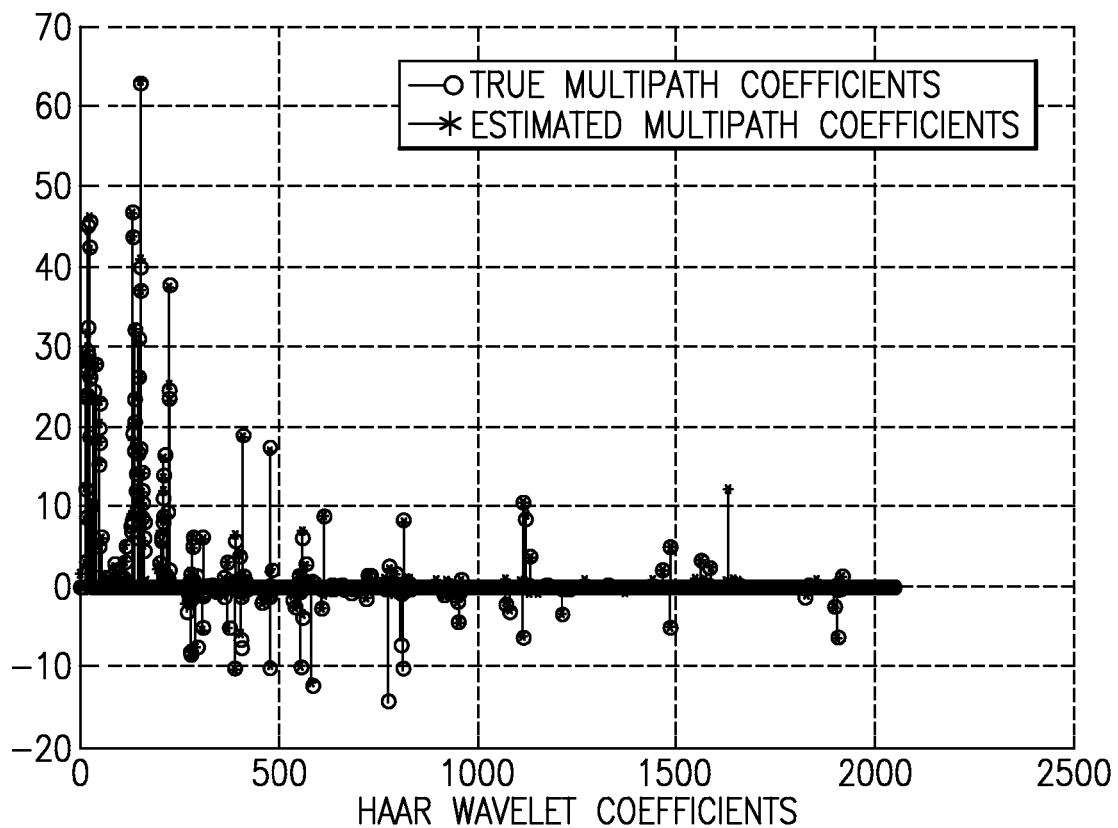
FIG. 9 is an illustration of the estimated Haar wavelet coefficients of a multipath signal used in the simulation example of FIG. 8 according to aspects of the invention.
Figure 10:
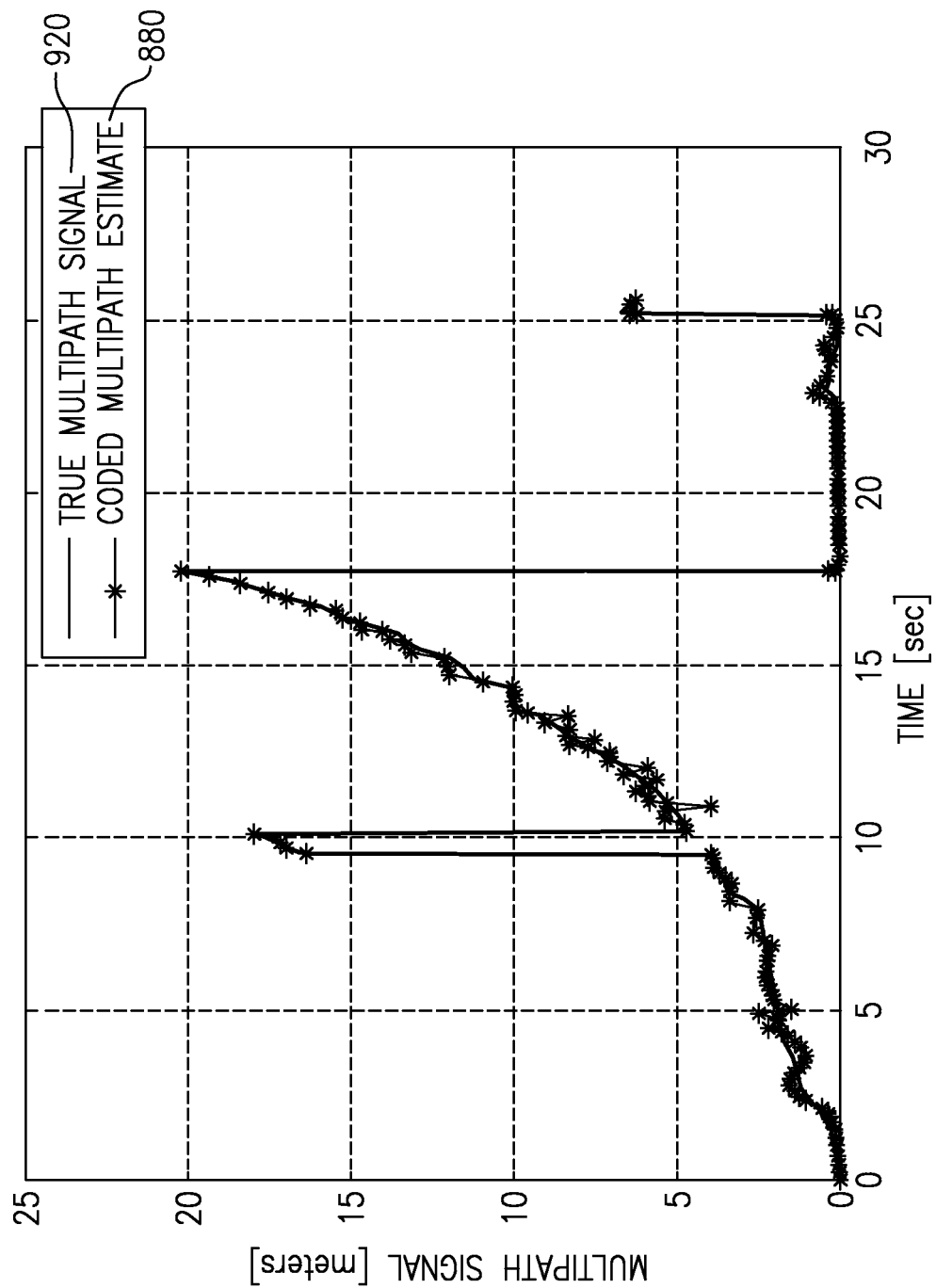
FIG. 10 is an illustration of an estimation of the multipath signal produced by the coded filter in the simulation example of FIG. 8.

Referring to FIG. 9, there is illustrated the estimated Haar wavelet coefficients of the multipath signal. As can be seen with reference to FIG. 9, the multipath signal 910 is well estimated by the Haar wavelet coefficients 920, and the multipath signal can therefore be considered a compressible vector, as discussed above. FIG. 10 illustrates the example coded filter's estimation of the multipath signal using the estimation techniques discussed above. That is, the example coded filter. As can be seen with reference to FIG. 10, the estimation 880 of the multipath signal produced by the coded filter closely tracks the true multipath signal 1020, demonstrating that the coded filter can very accurately estimate the compressible non-Gaussian noise vector, in this case, the simulated multipath signal.

Figure 11:
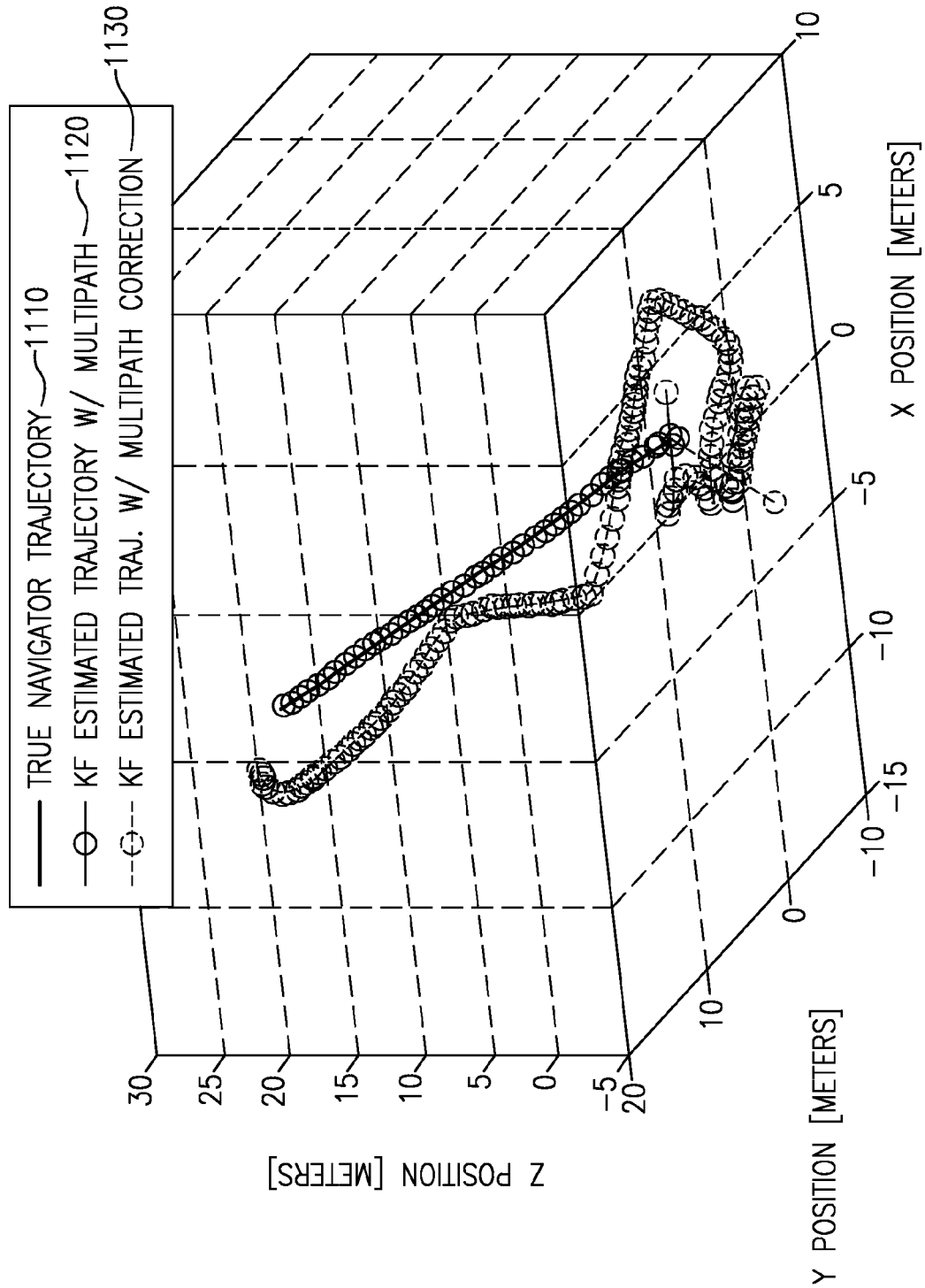
FIG. 11 is an illustration of example true and estimated trajectories of a navigator in the simulation example of FIG. 8.

FIG. 11 illustrates a simulation of the trajectory of the navigator 850. In FIG. 11, trace 1110 represents the true trajectory of the navigator, and trace 1120 represents the estimated trajectory produced by the Kalman filter alone, using the noisy measurements 860 without the coded filter. Trace 1130 represents the estimated trajectory of the navigator including the multipath correction performed by the coded filter, namely using the estimated multipath signal 880 to correct the measurements 860 simulated by the RF beacon model 830. As can be seen with reference to FIG. 11, the estimated trajectory of the navigator using the corrected measurements 890 (trace 1130) closely tracks the true trajectory (trace 1110); whereas the estimated trajectory without using the coded filter 870 (trace 1120) suffers from significant error.

Figure 12B:
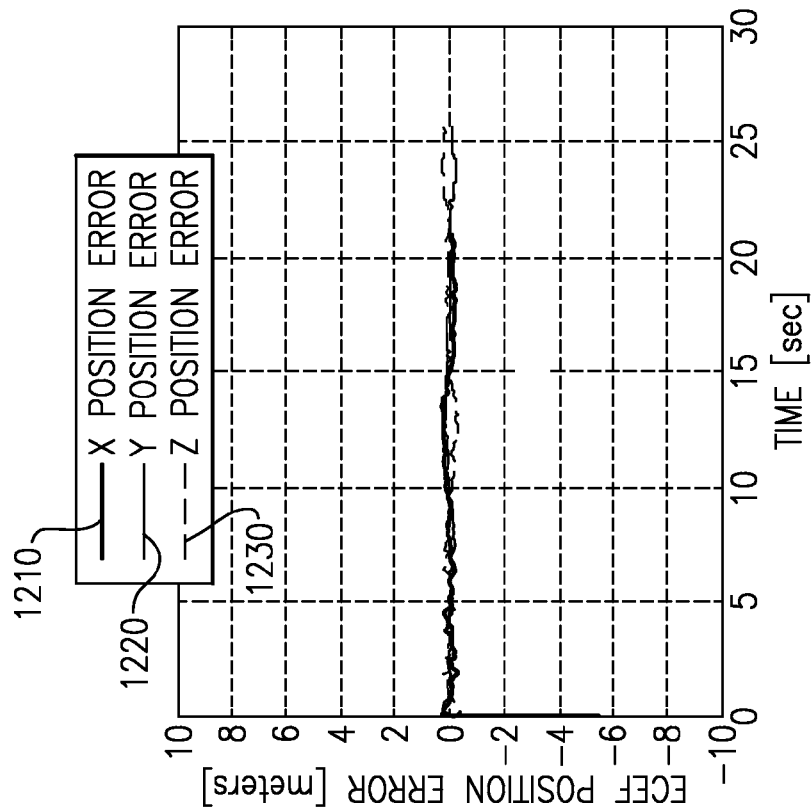
FIG. 12B is a plot of the positional error of the simulated navigator in the example system of FIG. 8 including a coded filter according to aspects of the invention.
Figure 12A:
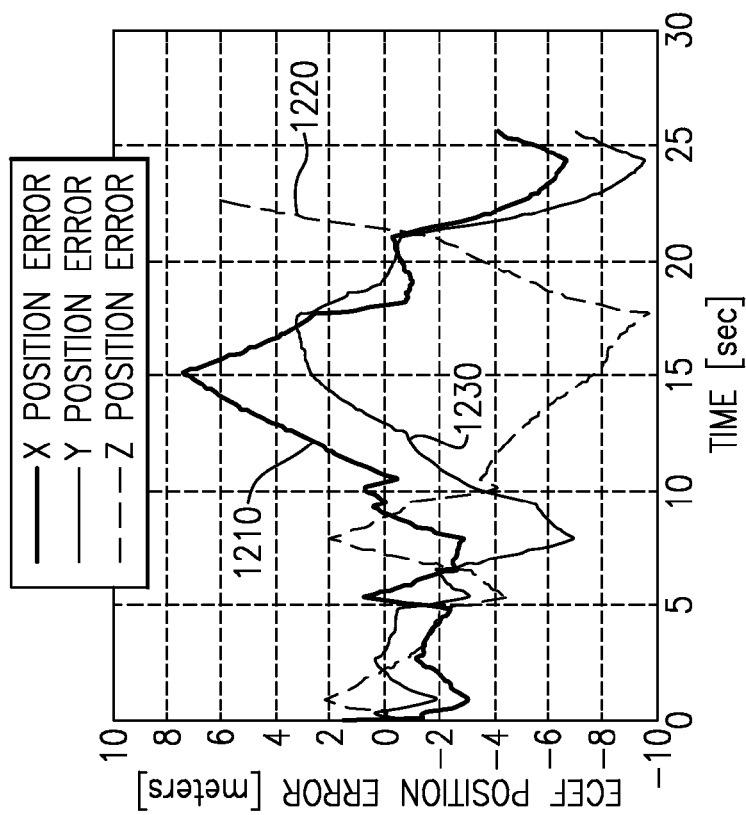
FIG. 12A is a plot of the positional error of the simulated navigator in an example navigation system without a coded filter.

FIG. 12A illustrates a plot of the error in the simulated navigator's position in each of the x-axis (trace 1210), y-axis (trace 1220) and z-axis (trace 1230) over time for a simulation without the coded filter. As can be seen with reference to FIG. 12A, there are dramatic errors in the estimated position of the navigator due to the unaccounted-for multipath signal. By contrast, FIG. 12B illustrates a plot of the error in the simulated navigator's position in each of the x-axis (trace 1210), y-axis (trace 1220) and z-axis (trace 1230) over time for a simulation including the coded filter 870. FIG. 12B illustrates that the positional errors are greatly reduced. Thus, this example demonstrates that embodiments of the coded filter applied to a navigation system can provide greatly improved performance (i.e., reduced error in the estimated position of the navigator) compared to a system using a conventional Kalman filter alone.

In summary, according to one embodiment, the coded filter uses the fact that certain non-Gaussian noise vectors, such as multipath in a navigation system, are compressible in some basis, along with well-defined, computationally efficient estimators, to provide an accurate estimate the non-Gaussian noise vector which can then be used to correct measurements of state variables in a dynamic system. Embodiments exploit the duality between compressive sensing and error correction of a channel code to compute a coding matrix that annihilates the portion of the measurements/observations that are caused by the state, to gain observability of the non-Gaussian errors. In one example, a coded filter formulation includes estimating the non-Gaussian noise vector using a combination of sparse error models and recursive filter-based estimation together with $l_1$ (and/or $l_2$) minimization, as discussed above.

Embodiments of the coded filter may be applied to numerous dynamic systems where there are non-Gaussian errors that can be modeled as sparse signals. For example, as discussed above, a coded filter can be used to estimate GPS multipath signals, which can then be used to correct positional, velocity, acceleration or other data supplied to a recursive filter, such as a Kalman filter, in a navigation system. In another example, a coded filter may be applied to overcome GPS spoofing by modeling the spoofing signal as a sparse (compressible) phenomenon that can be detected and tracked. A coded filter may also be applied to field disturbances in magnetometers, where the non-Gaussian errors of magnetometers can be modeled as sparse signals. A coded filter may also be applied to failure detection in machines or processes where the failures occur as non-Gaussian phenomena. For example, a coded filter may be applied to fault detection/identification, where the non-Gaussian errors represent broken sensors, unwanted plant dynamics etc. Still other applications include vision aided navigation where feature extraction may challenge conventional systems, as features may be modeled as a sparse signal to be tracked using a coded filter; multipath estimation and mitigation in RF beacon- and/or sonar-based navigation systems; modeling wind gusts in aircraft systems, orbit modeling for spacecraft, and Doppler radar for navigation.

Various aspects and embodiments described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and embodiments may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 13:
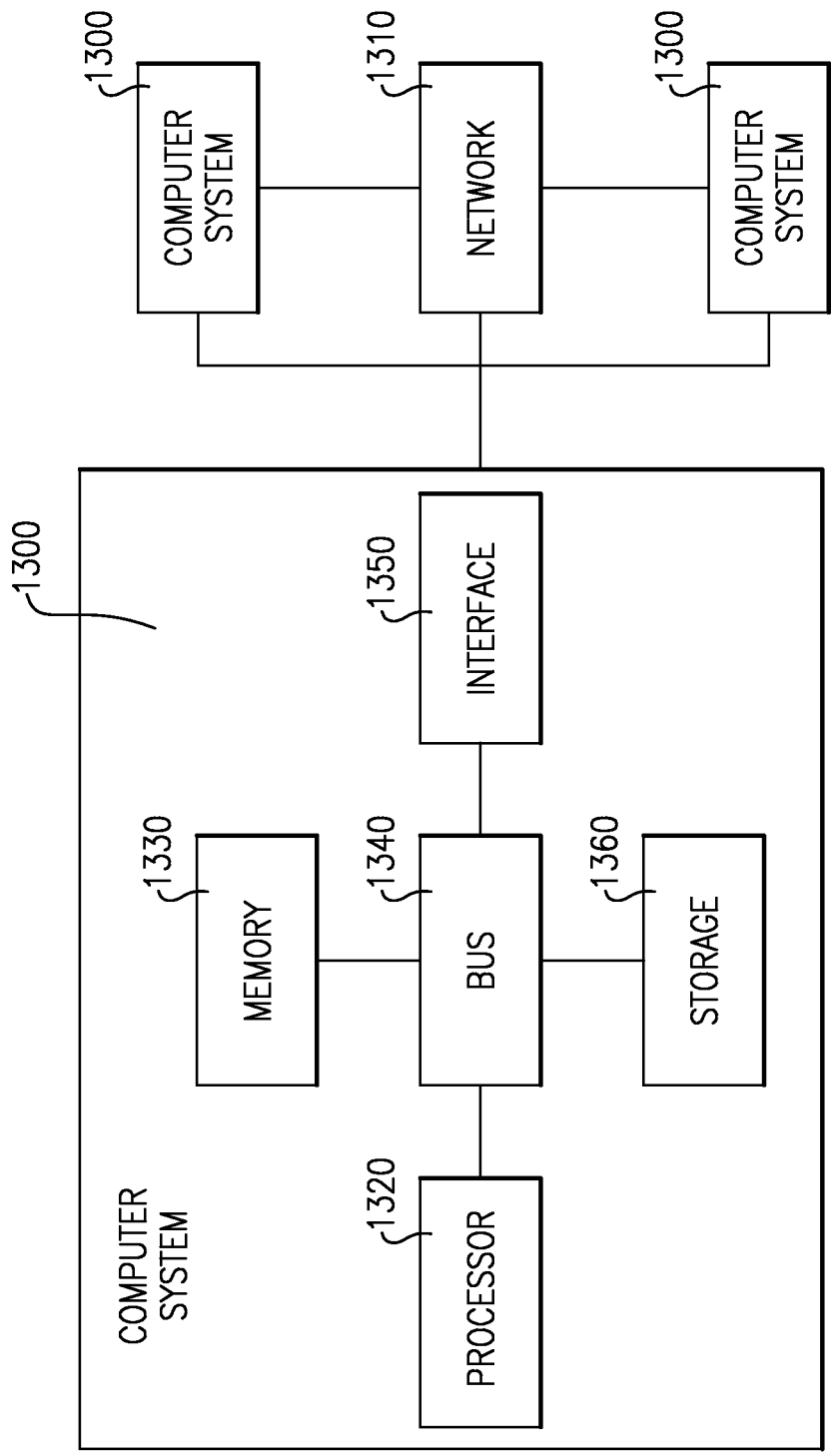
FIG. 13 is a block diagram of one example of a computer system in which embodiments of a coded filter may be implemented according to aspects of the invention.

Referring to FIG. 13, there is illustrated a block diagram of a computer system 1300 in which various aspects and functions of embodiments of the coded filter may be practiced. The computer system 1300 may be connected to a communication network 1310, and via the communication network exchange information with one or more additional computer systems 1300, as shown in FIG. 13. The plurality of computer systems 1300 interconnected by the communication network 1310 may together form a distributed computer system. The communication network 1310 may include any communication network through which computer systems may exchange data. To exchange data using the network 1310, the computer systems 1300 and the network 1310 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1300 may transmit data via the network 1310 using a variety of security measures including, for example, TLS, SSL or VPN. While FIG. 13 illustrates three networked computer systems 1300, a distributed computer system is not so limited and may include any number of computer systems and computing devices, networked using any medium and communication protocol.

As illustrated in FIG. 13, in one embodiment the computer system 1300 includes a processor 1320, a memory 1330, a bus 1340, an interface 1350 and data storage 1360. To implement at least some of the aspects, functions and processes disclosed herein, the processor 1320 performs a series of instructions that result in manipulated data. The processor 1320 may be any type of processor, multiprocessor, data processing engine, logic device, programmable logic device, or controller. Some examples of processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1320 is connected to other system components, including one or more memory devices 1330, by the bus 1340.

The memory 1330 stores programs and data during operation of the computer system 1300. Thus, the memory 1330 may be a relatively high performance, volatile, random access memory such as a dynamic random access memory (DRAM) or static memory (SRAM). However, the memory 1330 may include any device for storing data, such as a disk drive or other non-volatile storage device. Various examples may organize the memory 1300 into particularized and, in some cases, unique structures to perform the functions disclosed herein. These data structures may be sized and organized to store values for particular data and types of data.

Components of the computer system 1300 are coupled together by an interconnection element such as the bus 1340. The bus 1340 may include one or more physical busses, for example, busses between components that are integrated within a same machine, but may include any communication coupling between system elements including specialized or standard computing bus technologies such as IDE, SCSI, PCI and InfiniBand. The bus 1340 enables communications, such as data and instructions, to be exchanged between system components of the computer system 1300.

The computer system 1300 also includes one or more interface devices 1350 such as input devices, output devices and combination input/output devices. Interface devices 1350 may receive input or provide output. More particularly, output devices may render information for external presentation. Input devices 1350 may accept information from external sources. Examples of interface devices include keyboards, mouse devices, trackballs, microphones, touch screens, printing devices, display screens, speakers, network interface cards, etc. Interface devices 1350 allow the computer system 1300 to exchange information and to communicate with external entities, such as users and other systems.

The data storage 1360 includes a computer readable and writeable nonvolatile, or non-transitory, data storage medium in which instructions are stored that define a program or other object that is executed by the processor 1320. The data storage 1360 also may include information that is recorded, on or in, the medium, and that is processed by the processor 1320 during execution of the program. More specifically, the information may be stored in one or more data structures specifically configured to conserve storage space or increase data exchange performance. The instructions may be persistently stored as encoded signals, and the instructions may cause the processor 1320 to perform any of the functions described herein, for example to perform calculations to determine the matrices and solve the equations discussed above. The medium may, for example, be optical disk, magnetic disk or flash memory, among others. In operation, the processor 1320 or some other controller causes data to be read from the nonvolatile recording medium into another memory, such as the memory 1330, that allows for faster access to the information by the processor 1320 than does the storage medium included in the data storage 1360. The additional memory may be located in the data storage 1360 or in the memory 1330, however, the processor 1320 manipulates the data within the memory, and then copies the data to the storage medium associated with the data storage 1360 after processing is completed. A variety of components may manage data movement between the storage medium and other memory elements and examples are not limited to particular data management components. Further, examples are not limited to a particular memory system or data storage system.

Although the computer system 1300 is shown by way of example as one type of computer system upon which various aspects and functions may be practiced, embodiments of the coded filter are not limited to being implemented on the computer system 1300 as shown in FIG. 13. Various aspects and functions may be practiced on one or more computers having a different architectures or components than that shown in FIG. 13. For example, the computer system 1300 may include specially programmed, special-purpose hardware, such as an application-specific integrated circuit (ASIC) tailored to perform a particular operation disclosed herein. While another example may perform the same function using a grid of several general-purpose computing devices running an operating system (for example, MAC OS System X) with processors (for example, Motorola PowerPC processors) and several specialized computing devices running proprietary hardware and operating systems.

The computer system 1300 may be a computer system including an operating system that manages at least a portion of the hardware elements included in the computer system 1300. In some examples, a processor, data processing engine, or controller, such as the processor 1320, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1320 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A processor-implemented method of estimating a position of a navigator, the method comprising:
    receiving, from at least one sensor, measurements of the position of the navigator, the measurements being corrupted by compressible non-Gaussian noise;
    determining an estimated compressible non-Gaussian error at least in part by determining a basis in which the compressible non-Gaussian noise is compressible based on state information of a dynamic state estimator and the measurements;
    generating corrected measurements of the position of the navigator based on the estimated compressible non-Gaussian error and the sensor measurements; and
    estimating the position of the navigator based on the corrected measurements at least in part by providing the corrected measurements as an input to the dynamic state estimator and running the dynamic state estimator with the corrected measurements.

2. The method of claim 1, wherein the dynamic state estimator is a Kalman filter.

3. The method of claim 1, wherein estimating the position of the navigator based on the corrected measurements further includes:
    reconfiguring the dynamic state estimator based on the estimated non-Gaussian error to provide a reconfigured dynamic state estimator; and
    running the reconfigured dynamic state estimator with the corrected measurements to estimate the position of the navigator.

4. The method of claim 1, wherein determining the estimated compressible non-Gaussian error further includes:
    generating a coefficient vector at least in part by calculating coefficients of the basis in which the compressible non-Gaussian noise is compressible.

5. The method of claim 4, wherein determining the estimated compressible non-Gaussian error further includes:
    determining an annihilation matrix which annihilates a portion of the measurements corresponding to the position of the navigator; and applying a minimum l1 estimator to the coefficient vector, wherein the minimum l1 estimator is subject to constraints based on the coefficient vector, the measurements and the annihilation matrix.

6. A processor-implemented method of estimating position of a navigator, the method comprising:
receiving from a global positioning system (GPS) sensor GPS measurements of the position of the navigator, the GPS measurements being corrupted by multipath errors;
determining an estimated multipath error at least in part by calculating a coefficient vector of Haar wavelet coefficients based on state information of a Kalman filter and the GPS measurements, wherein the Haar wavelet coefficients together approximate the multipath errors;
generating corrected GPS measurements based on the estimated error and the sensor GPS measurements; and
estimating the position of the navigator based on the corrected measurements by providing the corrected measurements as an input to a Kalman filter and running the Kalman filter with the corrected measurements.

7. The method of claim 6, wherein determining an estimated multipath error further includes:
determining an annihilation matrix which annihilates a portion of the measurements corresponding to the position of the navigator; and
applying a minimum l1 estimator to the coefficient vector, wherein the minimum l1 estimator is subject to constraints based on the coefficient vector, the measurements and the annihilation matrix.

8. The method of claim 6, wherein estimating the position of the navigator based on the corrected measurements further includes:
reconfiguring the Kalman filter based on the estimated non-Gaussian error to provide a reconfigured Kalman filter; and
running the reconfigured Kalman filter with the corrected measurements to estimate the position of the navigator.

9. A position estimation device configured to estimate a position of a navigator, the device comprising:
at least one processor coupled to at least one sensor;
an error estimator component executable by the at least one processor and configured to:
receive sensor measurements corrupted by non-Gaussian noise from the at least one sensor,
determine a coefficient vector including coefficients of a basis in which the non-Gaussian noise is compressible based on state information of a dynamic state estimator and the sensor measurements,
estimate the non-Gaussian noise based on the coefficient vector, and
generate corrected measurements based on the estimate of the non-Gaussian noise and the sensor measurements; and
a position estimator component executable by the at least one processor and configured to:
receive the corrected measurements,
estimate the position of the navigator based on the corrected measurements at least in part by running the dynamic state estimator with the corrected measurements, and
provide the state information to the error estimator.

10. The position estimation device of claim 9, wherein the dynamic state estimator includes a Kalman filter.

11. The position estimation device of claim 9, wherein the error estimator component is further configured to determine an annihilation matrix which annihilates a portion of the sensor measurements corresponding to the position of the navigator based on an equation that defines a relationship between the sensor measurements, the position of the navigator and the non-Gaussian noise.

12. The position estimation device of claim 11, wherein the error estimator component is further configured to apply a minimum l1 estimator to the coefficient vector, the minimum l1 estimator being subject to constraints based on the coefficient vector, the measurements and the annihilation matrix, to provide the estimate of the non-Gaussian noise.

13. The position estimation device of claim 9, wherein the position estimator component is further configured to:
provide the corrected measurements as an input to a Kalman filter; and
run the Kalman filter with the corrected measurements to estimate the position of the navigator.

14. The position estimation device of claim 13, wherein the position estimator component is further configured to:
reconfigure the Kalman filter based on the estimated non-Gaussian error to provide a reconfigured Kalman filter; and
run the reconfigured Kalman filter with the corrected measurements to estimate the position of the navigator.

* * * * *